United States Patent [19]

Diggs

[11] 4,018,255
[45] Apr. 19, 1977

[54] TREE SAW

[76] Inventor: Richard E. Diggs, S. 12A Road, P.O. Box 776, Carthage, Mo. 64836

[22] Filed: Oct. 7, 1975

[21] Appl. No.: 620,261

[52] U.S. Cl. .................. 144/34 R; 37/2 R; 56/229; 83/836; 83/928; 144/2 N; 172/273; 172/304; 172/618

[51] Int. Cl.² ................................ A01G 23/08

[58] Field of Search .......... 172/273, 297, 304, 618; 56/229; 144/2 N, 3 R, 34 R, 34 A, 34 F, 309 AC; 83/836, 928; 37/2 R; 30/223, 369

[56] References Cited

UNITED STATES PATENTS

| | | | |
|---|---|---|---|
| 2,332,752 | 10/1943 | Ratcliff | 172/273 X |
| 2,404,518 | 7/1946 | Moran | 144/34 F |
| 2,594,997 | 4/1952 | Ringgold | 83/836 X |
| 3,330,314 | 7/1967 | Dickson | 144/34 F |
| 3,804,138 | 4/1974 | Adcock | 144/34 F |
| 3,809,135 | 5/1974 | Dove | 144/34 F |

Primary Examiner—Othell M. Simpson
Assistant Examiner—W. D. Bray
Attorney, Agent, or Firm—Shoemaker and Mattare

[57] ABSTRACT

A tree saw for sawing trees beneath ground level. A saw blade is attached to the front end of a land vehicle which has furrow forming blades on the sides thereof. Movable cutting bits are pivotally attached to the saw blade longitudinal side edges and each bit has two cutting edges. One cutting edge contacts a tree during a forward stroke of the saw blade to cut the tree, and the other cutting edge contacts the tree on the reverse stroke to cut the tree. A hydraulic cylinder connected to the land vehicle moves the blade sideways to cut the tree while the vehicle moves forward and/or rearward.

15 Claims, 9 Drawing Figures

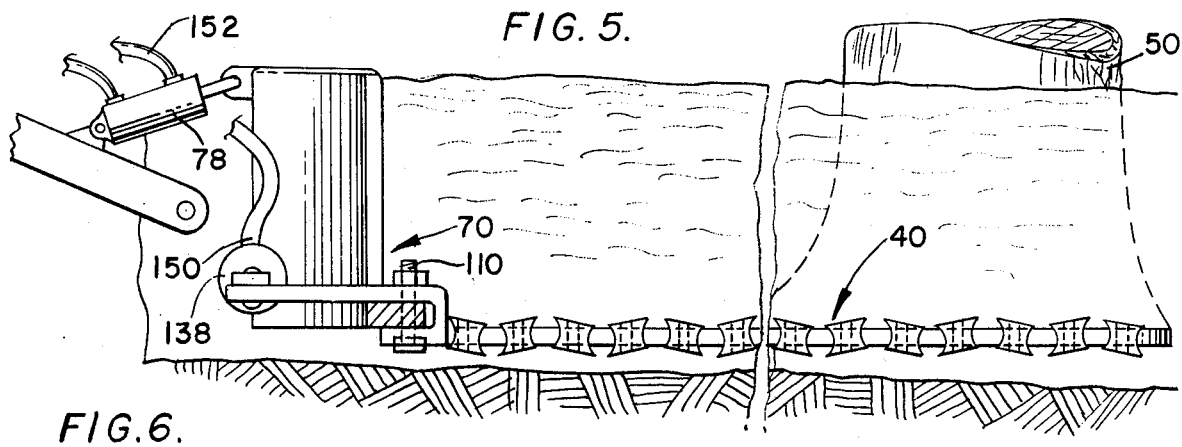
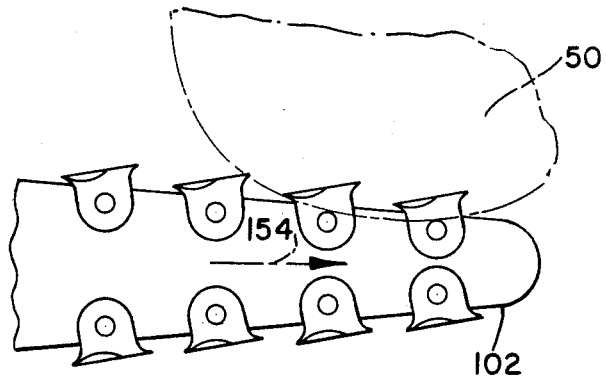
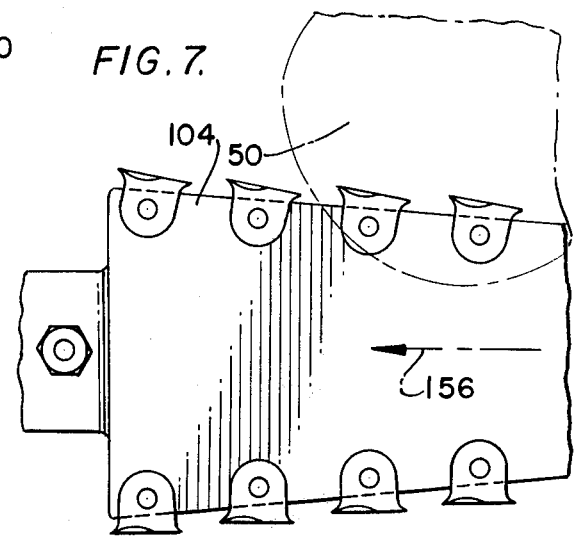
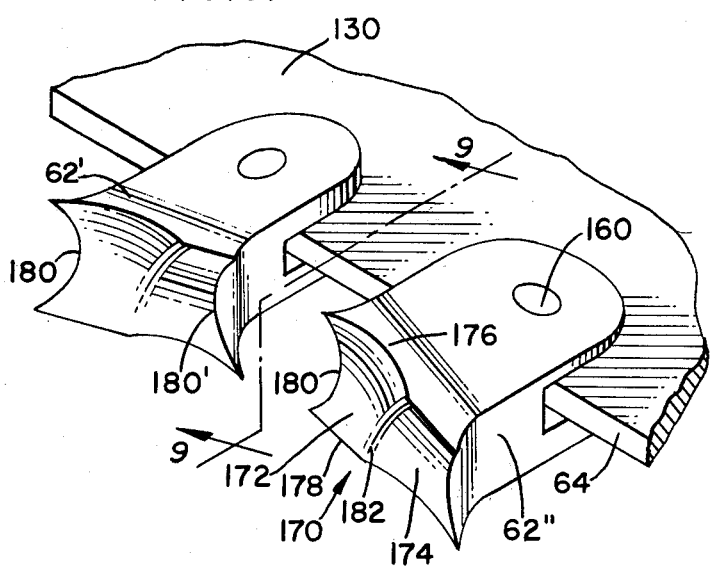

TREE SAW

BACKGROUND OF THE INVENTION

The present invention relates to implements used in tree felling, and, more particularly, to an implement used to saw trees from beneath ground level.

In many parts of the United States, as in many parts of the world, there is a great deal of rain fall. In these areas, the stands of timber are relatively virgin and there is a wide variety and mixture of tree sizes, including some that are quite large. It has been the experience of those clearing such areas for farming, or other uses, that many of the trees are two big to be cut off or pushed down by known means.

Often, bulldozers are used to clear such land. However, it has been found that in clearing land with bulldozers, smaller trees are uprooted and considerable amount of rock, roots, and other debris is created that is difficult to burn or otherwise dispose of. Furthermore, uprooting trees with a bulldozer often produces large holes in the cleared area which, even though refilled, become soft during rainy weather and therefore make it difficult to farm or otherwise utilize the land. It is also a slow and difficult procedure to push trees out by uprooting, and, of course, there is a limit to how big a tree even the largest dozer can fell.

Even if the trees can be uprooted, it has been found that the large balls of rocks and dirt that cling to the roots prevent these uprooted stumps from being easily disposed of. The whole tree mass with roots, rock and humus is often merely pushed aside into a rubble row and then allowed to dry. However, the drying process may require a year or more during which time the rubble presents many problems, not the least of which is the obstruction created which prevents the entire area from being farmed as a single block or unit.

A further problem attendent the uprooting procedure is the destructive nature thereof. Most timber soils have a relatively thin layer of humus which may be completely destroyed by the uprooting procedure. This distruction of the humus layer may cause a high level of errosion, and may also cut down on the possibility of establishing grass or other farming products in the remaining soil. Great amounts of fertilizer must then be used to replace the lost soil and to obtain the required production from the land.

In view of the above-discussed difficulties, a common procedure in farm land clearing is to cut the large trees with a chain saw, or the like, and then simply leave the stump. However, a better procedure is to cut off the stump or the tree beneath ground level. The cut is made deep enough so that a plow, or other such farm implement, can pass over the remaining stump without damage to the implement.

There are known devices which cut off tree stumps beneath ground level. One such device comprises a pair of flat blades which are affixed to a bulldozer and have cutting teeth formed thereon adjacent a wedging member. A gash is made in a tree using the saw teeth on a first pass and on a subsequent pass the wedging member is engaged in that gash to chip off some of the tree while making a new gash. The process is repeated until the tree stump has been removed. While cutting off tree stumps beneath the ground surface is accomplished by this device, the device is quite slow due to the great number of passes required for completing the operation. Furthermore, the wedging member, when engaged in a gash in the tree, makes steering of the bulldozer quite difficult.

The device embodying the present invention saws a tree stump from beneath ground level during both forward and rearward movement of a saw.

SUMMARY OF THE INVENTION

The device embodying the present invention quickly and neatly removes a tree stump from beneath ground level by sawing the tree stump during both the forward and rearward movements executed by the saw blade during a sawing motion.

The device embodying the present invention comprises a saw blade mounting means connected to a land vehicle, such as bulldozer. The mounting means extends beneath ground level and the saw is connected thereto beneath the ground level, and extends forwardly thereof. Pivotally mounted along the lateral side edges of the saw blade are a multiplicity of cutting bits which each have a pair of cutting edges on a base, and which are spaced from the saw blade longitudinal side edges. Each of the cutting bits is pivotally mounted on the saw blade to tip forwardly when the saw blade moves rearwardly during the sawing motion, and to tip rearwardly when the saw blade undergoes a forward movement during the sawing motion. Therefore, during forward movement of the saw blade, one of the cutting edges is presented outwardly of the saw blade longitudinal side edge for contacting the side of a tree, and during a rearward movement of the saw blade, the other cutting edge is presented outwardly of the saw blade longitudinal side edge for contacting a tree. Therefore, a tree is cut by the cutting bits during both a forward and a rearward motion of the saw blade.

Because the saw blade cuts the tree beneath the ground surface on both the forward and rearward movement thereof, removal of tree stumps is both neat and rapid. Once removed from the ground, the tree stump is easily handled for removal from the field. The device also comprises a sweep cylinder connected to the land vehicle and to the saw blade for moving that blade sideways, that is transverse to the longitudinal axis of the saw blade. The sweep cylinder is therefore used to move the saw blade against the side of a tree while the land vehicle continues along a straight line path. Therefore, steering of the vehicle is relatively unimpeded by the sawing operation.

Side mounted plow blades located on the rear end of the land vehicle can be used to make furrows in the ground adjacent the tree stump to be removed. The furrow can be of a depth suitable for removing the tree stump. Once the furrow is made, the vehicle is repositioned with the saw blade engaging the tree, and the sawing operation is commenced, with the saw blade located in the furrow and therefore beneath the surface of the ground.

Therefore, the device of the present invention can be utilized on small land vehicles and develops a uniform and continuous small side load while moving straight forward and backward. A cutting action is obtained on both the push and the pull operations of the vehicle which therefore doubles the cutting rate and prevents undue stresses and loads upon the vehicle. Furthermore, the teeth are replacable and, in the preferred embodiment, are made of tungsten carbide so they are able to cut through any type of rock without significant dulling or damage thereto.

The saw of the present invention is therefore much lighter then known saws because of the double cutting action which enables this saw to require fewer teeth to accomplish the same cutting job. Therefore, the saw is quickly attached to, and detached from, the vehicle. A plurality of saw implements can therefore be used to clear land having a large variety of trees ranging in size from small shrubs to large timber trees.

Furthermore, the depth of the furrow can be as much as one foot beneath the ground so that normal farming can occur without damage to the implements after the stumps have been removed.

OBJECTS OF THE INVENTION

Therefore, a main object of the present invention is to cut trees beneath the ground during both forward and rearward motions of a saw blade.

Another object of the present invention is to cut trees beneath ground level without imparing the steering of a vehicle to which a saw blade is mounted.

A further object of the present invention is to provide replaceable teeth for a saw blade used to cut trees off beneath ground level.

Still another object of the present invention is to provide a saw blade which is easily attached to and detached from a vehicle.

A specific object of the present invention is to cut off trees at depths of a foot or more beneath ground level.

These together with other objects and advantages which will become subsequently apparent reside in the details of construction and operation as more fully hereinafter described and claimed, reference being had to the accompanying drawings forming part hereof, wherein like numerals refer to like parts throughout.

DESCRIPTION OF THE DRAWINGS

FIG. 5 is a sectional view taken along line 5—5 of FIG. 4;

FIG. 6 is a detailed view of a saw blade embodying the teaches of the present invention engaged a tree;

FIG. 7 is a detailed view of the rear of a saw blade embodying the teachings of the present invention;

FIG. 8 is a perspective view of a pair of cutting bits embodying the teachings of the present invention; and FIG. 9 is a detailed elevation view of a cutting bit embodying the teachings of the present invention.

DETAILED DESCRIPTION OF THE PREFERRED EMBODIMENT

Figure 1:
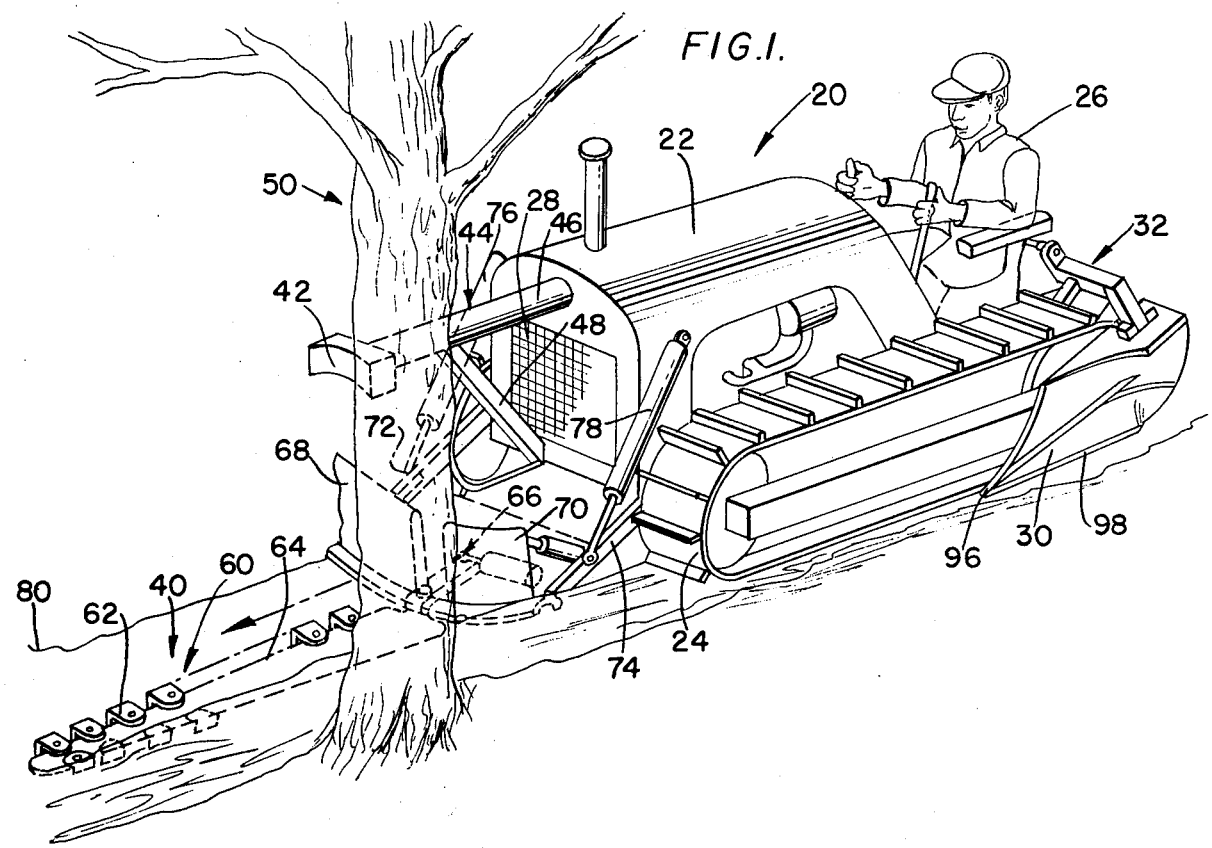
FIG. 1 is a perspective view of the device embodying the present invention in operation.

Shown in FIG. 1 is a device 20 used for clearing land which has trees of varying sizes growing thereon. The apparatus comprises a land vehicle 22, such as a tractor or bulldozer, having a pair of endless treads 24 thereon for moving that vehicle in response to the control of an operator 26. The vehicle 22 has a grill 28 on the front end thereof and a pair of side blades 30 connected to the rear end thereof by a control linkage 32 which is controlled by operator 26 to lower the side blade 30 into the ground to form a furrow 40 of any suitable depth.

Located on the front of the vehicle 22 is a pusher plate 42 connected to the front frame of the vehicle by a pusher plate brace means 44 comprising a horizontal arm 46 mounted on the front of vehicle 22 near the top thereof and brace arm 48 connected to the horizontal arm 46 and to the bottom front of the vehicle 22. The pusher plate 42 can be used to push over trees, such as tree 50.

Connected to the bottom front of vehicle 22 and located in furrow 40 is a saw 60 comprising a multiplicity of laterally extending teeth 62 mounted on the longitudinal side edges 64 thereof. The saw 60 is mounted on a mounting means 66 comprising a pair of front blades 68 and 70 connected to the front of the vehicle by arms 72 and 74, respectively. Hydraulic cylinder means 76 and 78 control the arms and the blades respectively to control the depth with which the saw 60 is located beneath the ground surface 80.

Figure 2:
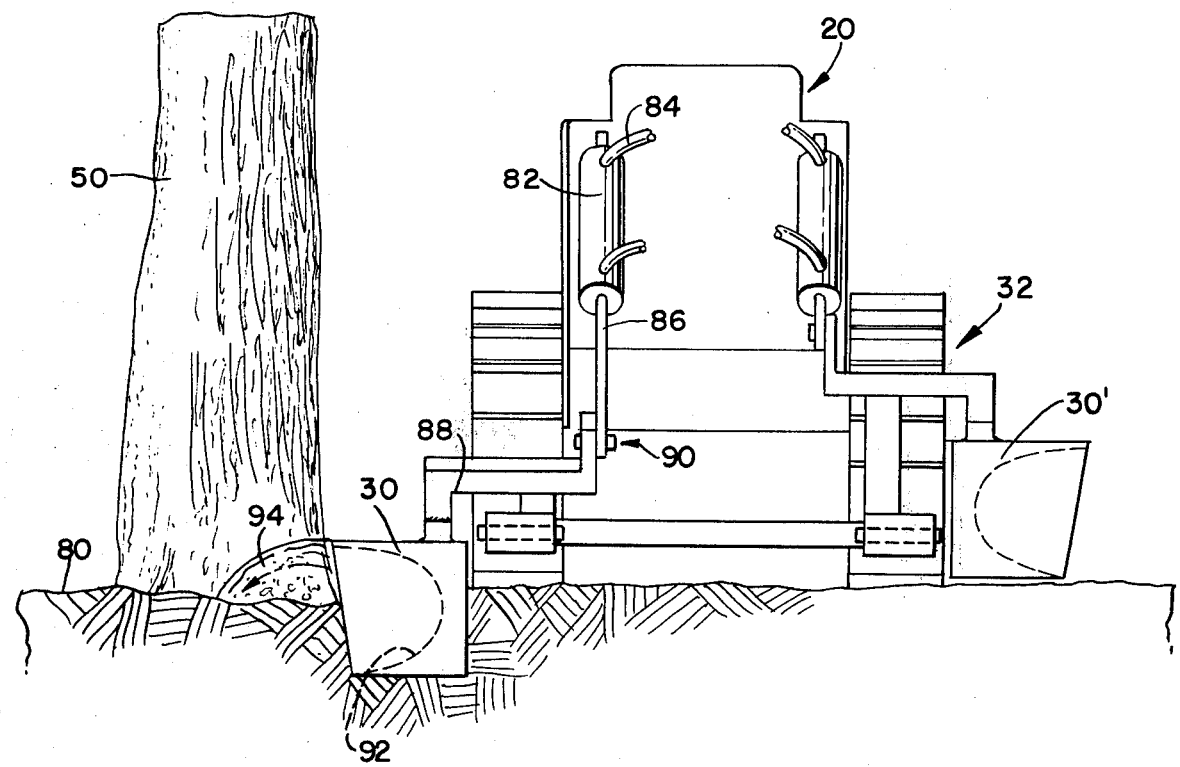
FIG. 2 is an end view of a land vehicle used in conjunction with the device embodied in the present invention.

As shown in FIG. 2, a blade 30 is lowered beneath the ground surface 80 by operating hydraulic cylinder 82 which is supplied by hydraulic lines 84 to actuate actuating arm 86 to rotate control linkage 32 to thereby lower the blade. The actuating arm 86 is pivotally connected to a control arm 88 by pivotal connection 90. As shown, the blade 30 comprises a curved blade face 92 which forces dirt outwardly out of the blade into a pile 94 as the front edge 96 and the lower edge 98 of the side blade 30 cut through the dirt. As shown in FIG. 2, side blade 30 is in the active position while side blade 30' is in the inactive position.

The blade 30 forms furrow 40 adjacent tree 50 at any suitable depth to expose a portion of the trunk of the tree beneath the surface 80. When the tree is cut near the bottom of the furrow 40, any stump remaining after the tree has been removed will be located beneath the surface of the ground. This depth can be set according to several conditions, such as anticipated depth of plow cuts, or the like.

Figure 3:
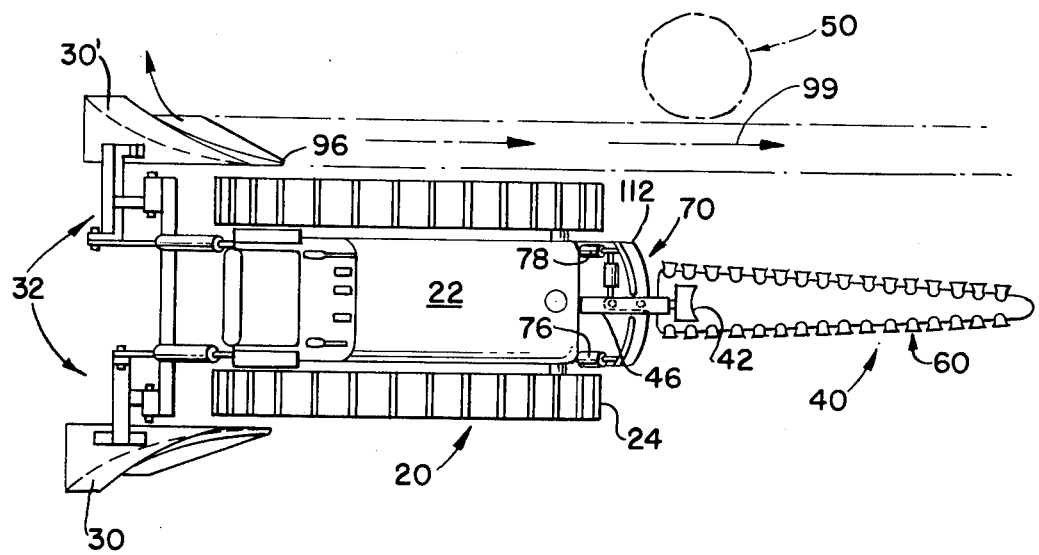
FIG. 3 is a plan view of the device shown in FIG. 1.

FIG. 3 shows the direction of movement of the land vehicle 22 during the furrow-making procedure. The direction of the vehicle is shown by arrows 99.

Figure 4:
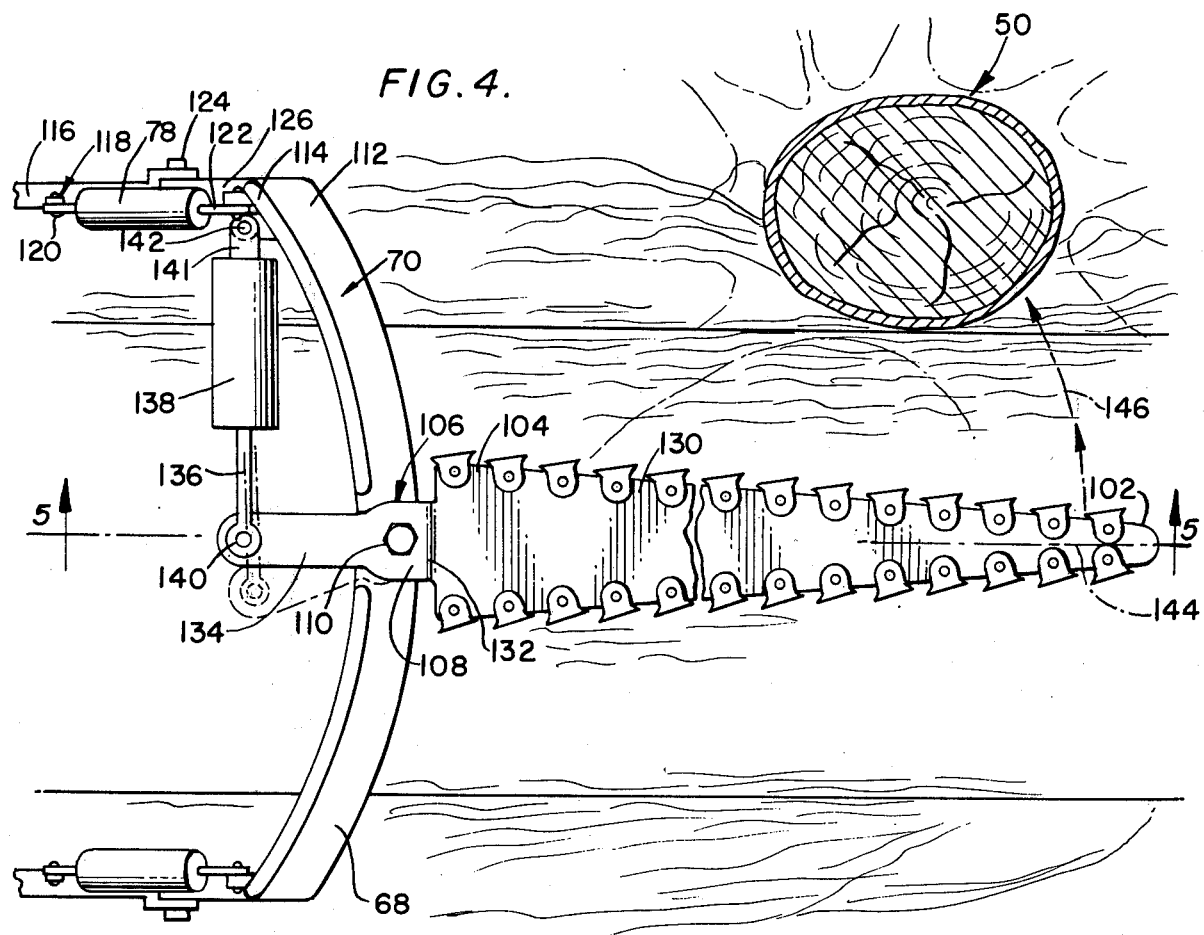
FIG. 4 is a plan view of a saw blade embodying the teachings of the present invention.

As shown in FIG. 4, blade 60 comprises a front end 102 and a rear end 104 to which is attached clevis 106 comprising upper flange 108 and lock nut 110. Both dozer blades 68 and 70 are identical, and therefore, in the interest of clarity, only one blade will be discussed. As shown in FIG. 4, dozer blade 70 comprises lower flange 112 which extends forwardly of the blade and verticle blade 114 which extends upwardly therefrom. The blades are shown in FIG. 4 as being curved, however, other shapes may also be used. The blade 70 is controlled by cylinder 78 which is mounted on trunnion 116 by mounting flange 118 and pivot nut 120. Connecting arm 122 connects the cylinder 78 to the blade 68, and pivot pin 124 connects trunnion 116 to extension arm 126 of blade 70.

As shown in FIG. 4, blade 60 comprises a triangular mounting element 130 connected to clevis 106 by gooseneck connection 132. Clevis 106 comprises an extension arm 134 extending rearwardly of blade 68 and pivotally connected to actuating arm 136 of actuating cylinder 138 by pivot pin 140. The actuating cylinder is pivotally connected to arm 126 by mounting flange 141 and pin 142. Actuating cylinder 138 causes saw 60 to move sideways, that is transverse to longitudinal centerline 144 of the saw blade, as shown by arrows 146, toward the tree 50. The saw blade 60 engages the side of tree 50 to perform a sawing operation, and that position of the saw is indicated by the dash, dot lines shown in FIG. 4 for the clevis 106.

In the preferred embodiment, the triangular mounting element 130 is a forging of spring steel which is some 15 inches long.

As can be seen in FIG. 4, the side thrust necessary to perform a sawing operation can be generated by the hydraulic cylinder 138. Therefore, the side thrust need not be generated by steering the land vehicle 22 sideways into the side of the tree as is required by known devices. By providing the hydraulic cylinder 138, wear and tear on the steering clutches, main drive clutches, transmission, tracks, and other mechanical equipment in the land vehicle which generally deteriorates and causes a maintenance problem is considerably reduced. Therefore, a uniform and continuous pressure can be applied by the blade 60 to cut the tree 50 from the side thereof. Furthermore, the vehicle can be moved in straight lines relative to the furrows 40 and is therefore easier to steer than a vehicle which must be steered sideways to perform a sawing action.

Once the sawing action is completed to a predetermined degree, the saw blade can be pivoted laterally to an inactive position and the pusher plate engaged against a tree to push that tree over. Therefore large trees can be felled quickly and easily and remain in a condition wherein they are easily removed from the field.

FIG. 5 shows the saw blade engaging the base of a tree stump at a substantial depth beneath the ground surface. FIG. 5 also shows a hydraulic line 150 and hydraulic lines 152 used to conduct hydraulic fluid to and from cylinders 78 and 138 respectively.

FIGS. 6 and 7 show the blade front end 102 with the cutting bits 62 engaging the outer surface of the tree 50 during the first portion of a sawing stroke, and FIG. 7 shows the rear end 104 of the saw blade 60 with cutting bits 62 located a distance inside the tree at the end of a sawing stroke. The arrow 154 in FIG. 6 shows the forward movement of the blade during the sawing motion, and arrow 156 in FIG. 7 shows the rearward movement of the blade during the sawing motion.

The cutting bits 62 are best shown in FIGS. 8 and 9, and are cleved to mounting element 130 by clevis pin 160 so that longitudinal side edge 64 is spaced from inboard edge 162 of the yoke-like cutting bit to leave a space 166 therebetween. The space 166 enables the cutting bit to pivot about clevis pin 160 as the saw blade undergoes the sawing motion shown in FIGS. 6 and 7.

As shown in FIG. 8, the cutting bit 62 can tilt forward as shown for cutting bit 62′, or backward as shown for cutting bit 62″. The yoke-like cutting bit is shown to be curved in FIG. 8, but may be other suitable shapes.

As shown in FIG. 8, each cutting element has a contoured biface workpiece engaging surface 170 comprising faces or working surfaces 172 and 174. As each of the surfaces 172 and 174 are identical with each other, the present description will refer to only surface 172, however it is understood that such description is equally applicable to surface 174.

AS shown in FIG. 8 and FIG. 9, surface 172 is oriented to be essentially parallel to longitudinal side edge 64 and comprises a first concave edge 176 along the top plane thereof and a second straight edge 178 along the bottom plane of cutting bit 62. A cutting edge 180 is concave and is located on the outer extremity of the cutting bit, and a relief edge 182 has an ogee shape and is located at approximately the mid-point of the workpiece engaging surface. The surface is contoured to smoothly connect the points on each of the edges with points on opposed edges.

The contoured shape of the workpiece engaging surface of the cutting bits enables those bits to cut a portion of the workpiece, in this case forming a kerf on the side of a tree, and to smoothly remove the portion of the workpiece cut therefrom with a minimum of friction and binding. The reduction in friction enables a small land vehicle to cut through large trees without unduly taxing the motor of the vehicle.

As shown in FIG. 8, the cutting bits tilt to expose cutting edges 180 and 180′ on alternate movements of the saw blade. Thus, on a forward movement of the saw blade, as shown by arrow 154 of FIG. 6, the cutting bit will tilt backward to expose cutting edge 180′ to the workpiece to cut that workpiece. On the return movement of the saw blade, shown as arrow 156 in FIG. 7, the inertia of the cutting bit forces that bit to tilt forward and expose cutting edge 180 to the workpiece to cut that workpiece. Therefore, it is possible to maintain the saw blade 60 in continuous contact with the workpiece during both the forward and the rearward sawing movements and to therefore cut the workpiece during both the forward and the rearward movement of the saw blade. Therefore because of this forward and backward tipping of the cutting bits, opposing cutting bits are always tearing out large chunks of material as the saw passes through the body of the tree. The contour of the cutting bits produce a cutting action which is downward along edge 180 and upward along edge 180′ as faces 172 and 174 respectively pass through the workpiece. Thus, the cutting bits cut on the top side going forward and on the bottom side on the other half of the teeth, and, when the direction of saw movement is changed, the cutting motion switch and cut on the opposite sides of the teeth.

In the preferred embodiment, the teeth are tungsten carbide and are removable from the saw blade. Therefore, the teeth can cut through rock, or other hard material without quickly dulling the cutting edges, and can be replaced if eventually damaged or dulled to the point where the cutting bit does not operate efficiently.

As the cutting blade cuts on both the forward and reverse motions, small cutting blades can be used to fell a large tree. Furthermore, the blades are smaller, and hence lighter, then known cutting blades. Therefore, a plurality of blades can be maintained for felling trees having a variety of sizes.

In operation, the vehicle is maneuvered adjacent a tree to be felled, and one of the side blades 30 is lowered into the ground to a predetermined depth and a furrow made by driving past the three. The width of the furrow is arranged so that the saw 60 can be lowered thereinto by making successive passes adjacent the tree. Once the furrow is defined, the saw blade is lowered into the furrow adjacent the tree and cylinder 138 actuated to move the saw blade laterally against the side of the tree. The vehicle is then moved forward and backward to effect a sawing motion, during which motion the cutting bits tilt as above-described and cut the tree during both the forward and the reverse movement of the sawing motion. Once the tree is sufficiently cut, the saw blade 60 can be removed from the kerf by actuation of cylinder 138 into an inoperative position. The vehicle is maneuvered so that pusher plate 42 engages the tree and the tree can then be pushed over until it breaks the remaining portion of the tree. The roots are left in tact and hence no dirt or debris clings to the tree thus removed and the tree is intact and can thus be easily removed from the field. Furthermore, the intact tree can be put to other suitable uses, such as lumber, firewood, or the like. The tree is therefore not wasted as it would be if it were burned or comminuted. Alternatively, the sawing can continue until the tree is completely cut through. After the tree has been felled, the side blades can be used to fill in the furrow or the filling process can be effected in any other suitable manner.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. An apparatus for sawing trees beneath ground level, comprising:
   a mounting means having one end located beneath ground level;
   a saw blade having a forward and a rear end and attached to said one end and thus located beneath ground level;
   motive power means attached to said mounting means for urging said saw blade against a side of a tree and for alternately moving said saw blade in a forward and then in a rearward direction so that said saw blade undergoes a sawing motion;
   a multiplicity of cutting bits attached to said saw blade, each cutting bit having a base pivotally attached to said saw blade and a pair of oppositely directed cutting edges on said base and spaced from said saw blade, said bits being mounted on said saw blade to tip forwardly when said saw moves rearwardly and rearwardly when said saw blade moves forwardly so that during forward movement of said saw blade, one cutting edge is presented outwardly thereof for contacting a tree, and during rearward movement of said saw blade, the other cutting edge is presented outwardly thereof for contacting a tree for cutting a tree beneath ground level during movement of said saw blade in both said forward direction and said rearward direction when said saw blade undergoes said sawing motion, said cutting bits each including a pair of faces, each face having an arcuate cutting edge on one end and an arcuate relief edge on the other end thereof.

2. The apparatus of claim 1 wherein said saw blade is pivotally attached to said mounting means for undergoing sideways movements, and including means for moving said saw blade sideways for contacting a tree with said cutting bits to saw said tree.

3. The apparatus of claim 2 wherein said bit cutting edges includes a forward cutting edge and a rear cutting edge with said forward cutting edge presented outwardly during said saw blade rearward motion and said rear cutting edge presented outwardly during said saw blade forward motion.

4. The apparatus of claim 3, wherein said arcuate cutting edges are C-shaped and said arcuate relief edges are Ogee-shaped.

5. The apparatus of claim 4 wherein said cutting bits are tungsten carbide.

6. The apparatus of claim 1, with said cutting bits each being yoke-like and having a pair of spaced apart legs straddling an edge of said saw blade, and further including connecting means pivotally connecting said legs to the outside of said saw blade.

7. The apparatus of claim 2 wherein said moving means includes a hydraulic cylinder attached to said motive power means.

8. The apparatus of claim 7 wherein said saw blade is triangular in shape.

9. The apparatus of claim 1 wherein each of said cutting bit bases is in the form of a yoke and is attached to said saw by a pin in a manner such that a space is defined between said blade and said base so that said bit can tilt about said pin during said sawing motion.

10. The apparatus of claim 1 wherein each of said cutting bits has a contoured biface workpiece engaging surface which includes a pair of cutting surfaces.

11. The apparatus of claim 10 wherein each of said cutting surfaces comprises a first concave edge along a first plane thereof, a second straight edge along a second plane thereof, a third concave edge along a third plane thereof and a relief edge along a fourth plane thereof.

12. The apparatus of claim 11 wherein said relief edge has as ogee shape and is located at approximately the mid-point of said workpiece engaging surface.

13. In combination with an apparatus for sawing trees beneath ground level having a land vehicle having sides and a saw blade mounted thereon, which saw blade has a multiplicity of cutting bits mounted thereon each of which has a base pivotally attached to said saw blade and a paire of oppositely directed cutting edges on said base, said bits being mounted to tip forwardly when said saw moves rearwardly and rearwardly when said saw moves forwardly so that each bit tilts to present one edge outwardly during a forward stroke and the other edge outwardly during a rearward stroke for contacting a tree to cut the tree on both a forward and rearward movement of the saw blade, a side blade pivotaly attached to one side of the land vehicle and moving means for moving said side blade to a position whereat a portion of it is beneath ground level for making furrows adjacent a tree to be sawed.

14. The combination of claim 13 wherein said moving means further includes a hydraulic cylinder connected to the land vehicle and a mechanical linkage connecting the hydraulic cylinder to said side blade.

15. The apparatus of claim 5 where said saw blade has a longitudinal side edge and said cutting bits are attached to said longitudinal side edge.

* * * * *